(12) United States Patent
Smith et al.

(10) Patent No.: US 8,918,641 B2
(45) Date of Patent: Dec. 23, 2014

(54) DYNAMIC PLATFORM RECONFIGURATION BY MULTI-TENANT SERVICE PROVIDERS

(75) Inventors: Ned M. Smith, Hillsboro, OR (US);
Sanjay Bakshi, Portland, OR (US);
Suresh Sugumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 13/116,698

(22) Filed: May 26, 2011

(65) Prior Publication Data

US 2012/0303952 A1 Nov. 29, 2012

(51) Int. Cl.
*H04L 29/06* (2006.01)
*G06F 7/04* (2006.01)
*G06F 21/44* (2013.01)
*G06F 21/62* (2013.01)

(52) U.S. Cl.
CPC ............ *H04L 63/10* (2013.01); *H04L 63/0823* (2013.01); *G06F 21/44* (2013.01); *H04L 63/0876* (2013.01); *G06F 21/629* (2013.01)
USPC ........................................... 713/158; 726/28

(58) Field of Classification Search
CPC . H04L 63/10; H04L 63/0876; H04L 63/0823; G06F 21/629; G06F 21/44
USPC ......... 713/156, 157, 158, 159, 189, 155, 168, 713/171, 175, 176; 726/5, 25, 27, 1, 4, 8, 726/28, 34, 36; 380/279; 717/100, 178
See application file for complete search history.

(56) References Cited

U.S. PATENT DOCUMENTS

| 8,171,547 | B2 * | 5/2012 | Thorley et al. ................... 726/22 |
| 2003/0140223 | A1 * | 7/2003 | Desideri ........................ 713/153 |
| 2003/0233562 | A1 * | 12/2003 | Chheda et al. ................ 713/193 |
| 2005/0114653 | A1 * | 5/2005 | Sudia ............................. 713/158 |
| 2005/0246287 | A1 | 11/2005 | Lee |
| 2006/0112194 | A1 * | 5/2006 | Minogue et al. .................. 710/8 |
| 2007/0118749 | A1 | 5/2007 | Hagn |
| 2007/0294757 | A1 * | 12/2007 | Stephens et al. ................ 726/12 |
| 2008/0148414 | A1 * | 6/2008 | Tom ................................ 726/29 |
| 2009/0094421 | A1 * | 4/2009 | Lewis ............................ 711/154 |
| 2009/0300148 | A1 * | 12/2009 | Gomes .......................... 709/220 |
| 2009/0305673 | A1 * | 12/2009 | Mardikar ...................... 455/411 |

(Continued)

FOREIGN PATENT DOCUMENTS

| KR | 20097020967 | 12/2009 |
| WO | 2010088081 | 8/2010 |

OTHER PUBLICATIONS

PCT International Search Report and Written Opinion issued in corresponding PCT/US2011/067696, dated Aug. 31, 2012 (11 pages).

*Primary Examiner* — Abu Sholeman
(74) *Attorney, Agent, or Firm* — Trop, Pruner & Hu, P.C.

(57) ABSTRACT

A manageability engine or adjunct processor on a computer platform may receive a request for activation and use of features embedded within that platform from a service provider authorized by the manageability engine's manufacturer. The manageability engine may initiate a request for authority through the service provider to a permit server. The permit server may provide, through the service provider, proof of the service provider's authority, together with a certificate identifying the service provider. Then the manageability engine may enable activation of the features on the platform coupled to the manageability engine, but only by the one particular service provider who has been authorized.

26 Claims, 3 Drawing Sheets

(56) References Cited

U.S. PATENT DOCUMENTS

| | | | |
|---|---|---|---|
| 2010/0100946 A1* | 4/2010 | Hallam-Baker | 726/5 |
| 2010/0138931 A1* | 6/2010 | Thorley et al. | 726/27 |
| 2010/0218012 A1* | 8/2010 | Joseph et al. | 713/310 |
| 2010/0235249 A1* | 9/2010 | Smith et al. | 705/18 |
| 2010/0285834 A1* | 11/2010 | Hutchison, IV | 455/550.1 |
| 2011/0047033 A1* | 2/2011 | Mahaffey et al. | 705/14.66 |
| 2011/0070877 A1* | 3/2011 | Macaluso | 455/419 |
| 2011/0197077 A1* | 8/2011 | Chan et al. | 713/189 |
| 2011/0296175 A1* | 12/2011 | Shin | 713/164 |
| 2011/0302630 A1* | 12/2011 | Nair et al. | 726/4 |
| 2012/0042395 A1* | 2/2012 | Jain et al. | 726/30 |
| 2012/0096080 A1* | 4/2012 | Levesque et al. | 709/203 |
| 2012/0102479 A1* | 4/2012 | Smith et al. | 717/171 |
| 2012/0124678 A1* | 5/2012 | Shintani et al. | 726/29 |
| 2012/0221073 A1* | 8/2012 | Southwell et al. | 607/41 |
| 2012/0254624 A1* | 10/2012 | Malkhasyan et al. | 713/189 |
| 2013/0010955 A1* | 1/2013 | Lu et al. | 380/255 |

* cited by examiner

DYNAMIC PLATFORM RECONFIGURATION BY MULTI-TENANT SERVICE PROVIDERS

BACKGROUND

This relates generally to computer systems and, particularly, to the selective enabling of features on those computer systems by service providers.

Computer systems and components thereof can conceivably be provided with a set of features, some of which may not be active at the time of purchase by the end user. Service providers may then be authorized, for example in return for a fee, to activate those features on platforms now owned by end users.

One example would be that a computer may be sold with a given skew rate that enables a certain processor speed. A given service provider may wish to enable a higher speed to enable a service that the service provider wishes to provide. Then the service provider may make an arrangement with the manufacturer of the processor to enable the service provider to activate a higher skew rate than is available within the processor as sold. Such an activation may incur a charge from the service provider to the manufacturer. Then the service provider can bundle the activated feature, in this case a higher skew rate, with other features that the service provider provides.

DETAILED DESCRIPTION

In accordance with some embodiments of the present invention, dynamic platform reconfiguration may be possible by multi-tenant service providers. In other words, a given hardware device manufacturer may authorize more than one service provider to provide services to end users of the manufacturer's hardware. This may be implemented, in some cases, using a key structure that protects one service provider from the possibility that other service providers would use the hardware feature activated, presumably at a cost, by the first service provider.

As an example, a given service provider may wish to provide a higher skew rate than that originally provisioned in a processor sold by a manufacturer. The service provider may be able to do this using a permit service. The service provider may pay the component manufacturer in order to get a permit to activate the enhanced feature within the processor. But that service provider does not want a second service provider to come along and enable end users to use that same enhanced feature, in this case a higher skew rate, because the first service provider paid for the upgrade and could not compete on equal footing with the second service provider who obtained that feature at no cost.

At the same time, the hardware device manufacturer may prefer to sell the rights to upgrade the hardware device to multiple service providers. This provides greater revenue for the manufacturer and more services for the manufacturer's end users/customers.

In some embodiments, all of these disparate opportunities can be achieved by a combination of a permit and certificate scheme that allows different service providers to work with the same hardware device in the end user's platform. When the feature of the hardware device is enabled by one service provider, it is enabled with a certificate that identifies that service provider so that a second service provider cannot simply make use of that same activated feature without paying any fee to the manufacturer of the hardware device.

Figure 1:
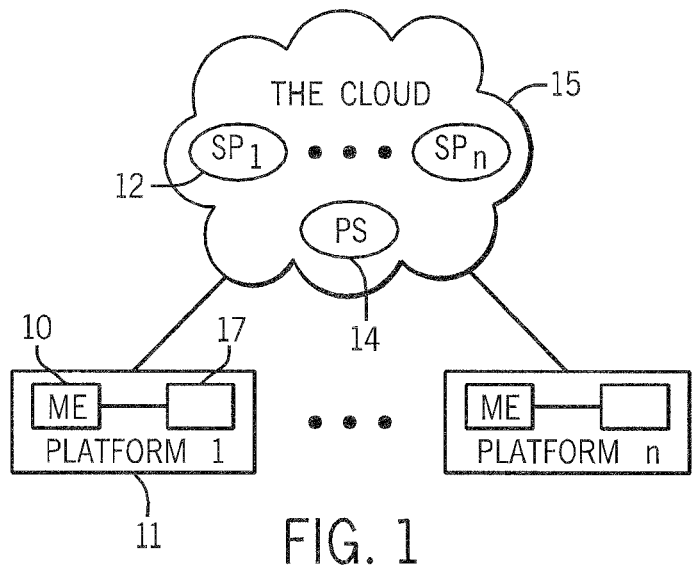
FIG. 1 is a schematic depiction of one embodiment of the present invention.

Thus, referring to FIG. 1, in accordance with one embodiment, a cloud or continuum computing environment may be realized. The cloud 15 may include any number of service provider servers 12 and any number of permit servers 14, while only one permit server is shown in this example. Any number of platforms 11 may communicate through the cloud with the service provider servers that, in turn, communicate through the cloud with the permit server or servers in one embodiment.

A storage 17 may be coupled to the manageability engine 10. The storage may be an optical, semiconductor, or magnetic memory.

Thus, a service provider who wishes to provide a service to a given platform 11 may attempt to activate a feature on the platform 11 that is necessary to provide the service. For example, a service provider may wish to enhance the operating speed of a given platform so that it will operate fast enough to efficiently do certain things that the service provider wants the platform to do.

In one embodiment, the service provider contacts the permit server to obtain a permit for the enhancement. In some cases, the permit may be obtained at a cost incurred by the service provider. In one embodiment, a charge may be incurred by the service provider to upgrade a third party's platform. Presumably, the service provider then gets compensated by the owner of the platform 11 or perhaps some other entity.

The service provider presents the permit to a manageability engine 10 within the platform 11. The manageability engine 10 may be a service processor or adjunct processor which, in some embodiments, is a second processor separate and apart from the central processing unit of the platform. However, other arrangements may also be possible. In some embodiments, the manageability engine may not even be accessed by the rest of the platform.

The manageability engine 10 then verifies that the permit is correct before it enables platform 11 capabilities to be modified. This prevents abuse of the platform and enforces the compensation scheme for the benefit of the manufacturer who sold the platform and/or manageability engine, presumably at a lower cost because all of the platform's capabilities were not activated.

If a platform feature is then activated, a second service provider cannot use that feature on the platform 11, in one embodiment, because the feature can only be activated in connection with a certificate, which is linked to one particular service provider. Thus, no other service provider that does not have the certificate can make use of the feature activated on the platform in such an embodiment. This prevents free loading service providers from benefiting from features activated by other service providers and, therefore, competing on an unequal cost basis.

Figure 2:
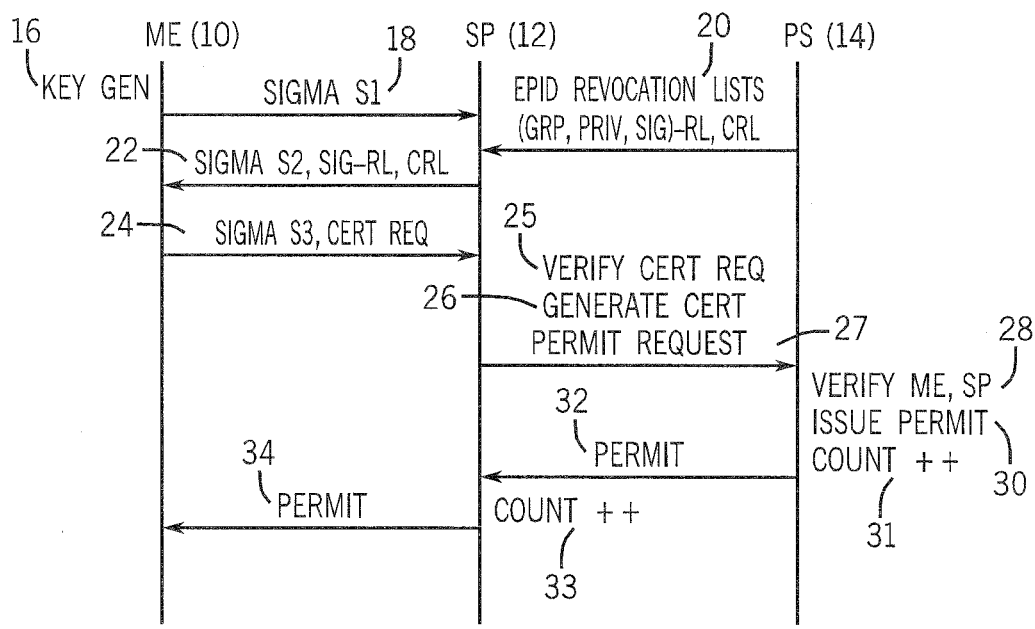
FIG. 2 is an end-to-end activation flow for one embodiment of the present invention.

Thus, in accordance with one embodiment, referring to FIG. 2, three entities may be involved. They are the manageability engine or ME 10, the service provider server 12, and the permit server 14.

The manageability engine 10 may perform operations that are protected from host (i.e. platform) based network threats in some embodiments. In other words, the manageability engine is isolated, not only from the platform 11, itself, but also from devices external to the platform, but connected over networks thereto. The manageability engine may be trusted by both the service provider and the permit server to protect resources and execution contexts of the platform.

The service provider provides a service to the owner of the platform based on asymmetric keys and identity protection technology, in some embodiments. The permit server ensures that the service provider has an appropriate, active business relationship with the platform or manageability engine manufacturer before enabling activation of features of the platform for the benefit of the service provider and platform end user.

Thus, initially, a key may be generated, as indicated at 16, locally by the manageability engine 10. That key is initially not activated because it cannot be used to perform any arbitrary transactions. Then, as indicated at 18, a secure or sigma channel is established between the manageability engine and the service provider. A sigma channel is a term used in Intel Media Vault technology, but any secure channel may be implemented in some embodiments of the present invention. The sigma channel may, for example, use signed Diffie-Hellman keys that are built into the manageability engine before its release to the end user. In one embodiment, the sigma channel may use enhanced privacy identification or EPID technology, available from Intel Corporation. EPID is a cryptographic scheme that enables the remote authentication of hardware devices, while preserving the privacy of the device owner. A hardware device with an embedded EPID private key can prove to a remote party that it is a valid device, certified by the hardware manufacturer, without revealing the owner's identity and without the verifier being able to link authentication attempts.

The same key may be used to attest that the platform is authentic. It may be authentic, for example, because it is made by the manufacturer who controls the permit server and who authorizes the service providers to activate features of the platform, including the manageability engine. The key may also be used to report the manageability engine's environment, including its firmware hash and version information to remote locations. In addition, the key may be used to disclose the public key to the service provider so the service provider can verify the key and establish that the platform is authentic.

The sigma channel may use Diffie-Hellman key exchange to create shared symmetric keys between the manageability engine and the service provider, while using EPID to attest that the manageability engine is legitimate. The service provider presents a certificate issued by the manufacturer of the manageability engine so that the manageability engine can verify that the service provider is authorized by that manufacturer. Then, as indicated at 20, the service provider relies on the permit server 14 to supply lists of key revocations (identified as GRP-RL, PRIV-RL and SIG-RL), as well as traditional revocation lists (CRL) for verification of the service provider. Thus, service providers whose rights are revoked can be readily identified by the manageability engine to ensure that only authorized service providers modify the features of the platform that includes the manageability engine.

Then, as indicated at 22, the service provider supplies the revocation list to the manageability engine so that the EPID signature operation may include proof that allows the service provider to determine EPID signature revocation status. The manageability engine receives the revocation status for the service provider's certificate. If the manageability engine is unable to process the revocation list, it may instead rely on an Online Certificate Status Protocol (OCSP) responder that is proxied via the service provider in another embodiment. See RFC 2560.11, X.509 Internet Public Key Infrastructure Online Certificate Status Protocol, Network Working Group Request for Comments, June 1999.

Then the manageability engine signs a nonce and the revocation list, as indicated at block 24, completing the secure protocol handshake. In addition, a certificate-signing request (CSR) for a key is supplied to the service provider for forwarding to the permit server. The certificate signing request contains the EPID signed attributes attesting to the legitimacy of the key and its default configuration attributes in one embodiment. The manageability engine then initiates a request for a permit from the permit server.

Next, as indicated at 25, the service provider, working in connection with a certificate authority (CA) backend verifies the CSR. This verification may include verification of the EPID signature over the key. The CA signature asserts that the information contained in the CSR is legitimate and, hence, it should verify the EPID signatures as well.

At 26, the CA backend issues a certificate for the key, which may include a certificate extension indicating how the key is protected. This may be achieved via copying the EPID attestation contained in the CSR into that certificate.

Thereafter, at 27, the service provider relays the permit request to the permit server, authorizing the permit server to activate a key for use. The permits may also authorize the service provider to assume administrative control over policies affecting the use of that key.

Next, at 28, the permit server verifies the permit request and checks whether the service provider's business agreements support activation of the key and use of supporting features in the manageability engine. The permit server may also verify that the manageability engine is capable of supporting the capabilities required by the service provider in some embodiments.

The permit server may also issue a permit (as indicated at 30) authorizing the manageability engine to activate the key for use with the service provider in appropriate cases. The service provider is then authorized to configure policies that control how the user platform, and other platforms may interact, using the key. The service provider then effectively becomes the owner of the key policies. At 31, the permit server updates a log detailing the service provider and the activation event, which may be used for charging the service provider in some embodiments.

Next, at 32, the permit issued by the permit server is supplied to the service provider's server. The permit may be specific to a particular platform and a particular key. If a second or third key is created, the second or third service provider could be employed as the key owner.

At 34, the service provider monitors permitting flows between the permit server and the manageability engine, in some embodiments. The service provider may also verify the permit originates from a legitimate permit server and the service provider may update a permit server log (as indicated at 33) of the activation. The permit server and service provider logs may be compared offline to audit accounting details pursuant to any business arrangements.

Finally, the manageability engine installs the permit by activating the key and enabling or filtering availability of manageability engine capabilities. For example, a service provider may be permitted to use strong multi-factor authentication, which would result in the manageability engine being configured to allow certain policies to be configured by the service provider related to secured attestation, for example. One such example is What You See Is What You Sign, wherein the content of the signed messages cannot be changed (WYSIWYS).

Figure 3:
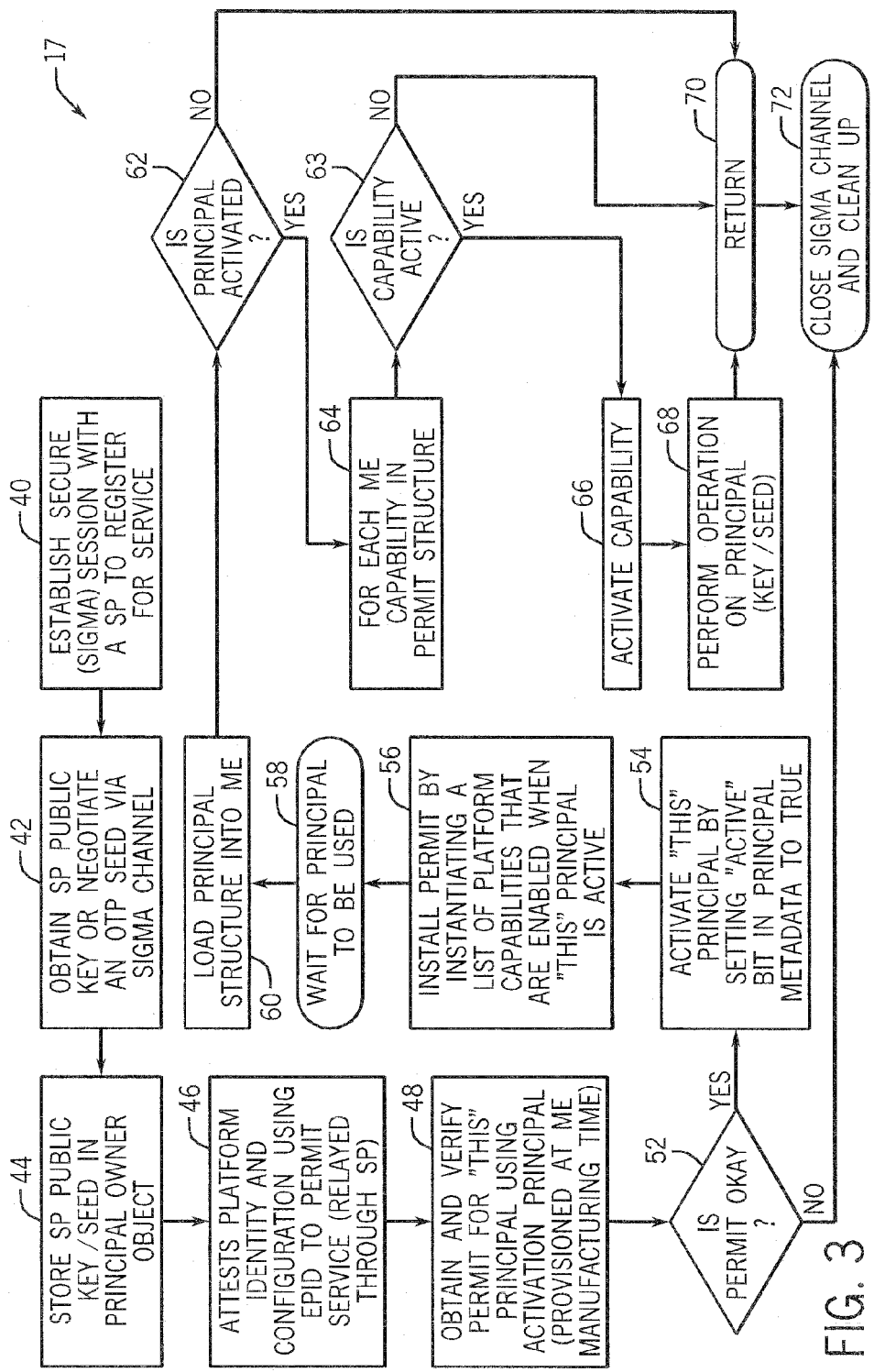
FIG. 3 is a flow chart for one embodiment of the present invention.

In accordance with one embodiment of the present invention, the flow chart, shown in FIG. 3, may be implemented in software, hardware, or firmware associated with the manageability engine. In a software embodiment, a sequence of instructions may be stored on a non-transitory computer readable medium, such as an optical, magnetic, or semiconductor storage device.

Beginning at block 40, a secure session is established by the manageability engine with a service provider to register for a desired service. The manageability engine may obtain the service provider public key or, as another example, negotiates a one-time password (OTP) seed (valid for only one log-in session) via a secure channel, such as a sigma channel, as indicated in block 42. Then the manageability engine stores the service provider's public key or seed in an owner principal object, as indicated in block 44.

Next, in block 46, the manageability engine attests platform identity and configuration using a key EPID to the permit server. This attestation may be relayed through the service provider. Then the manageability engine obtains and verifies the permit for this principal using an activation principal provisioned at the manageability engine at manufacturing time, in some embodiments, as indicated in block 48. The manageability engine then checks, at diamond 52, whether the permit is okay. If not, the transaction is nullified by closing the sigma channel and performing cleanup, as indicated at 72. If the permit is okay, then the manageability engine activates this principal or service provider, in one embodiment, by setting an active bit in the principal metadata to true, as indicated in block 54.

The manageability engine installs the permit by instantiating a list of platform capabilities that are enabled when this principal is active, as indicated in block 56. Then the manageability engine waits for the principal to be used at 58. The principal structure is also loaded into the manageability engine at 60. A check at diamond 62 determines whether the principal has been activated. If so, for each manageability engine capability in the permit structure (block 64), a check at diamond 63 determines whether the capability is active. If so, the capability is activated at block 66 and the operation is performed on the principal (key or seed) (block 68) and then the flow returns, as indicated at 70.

The sequences shown in FIGS. 2 and 3 may be implemented in hardware, software and/or firmware. In software embodiments, the sequence may be implemented by instructions stored on a non-transitory computer readable medium, such as an optical, magnetic, or semiconductor memory, including, for example, the storage 17. The storage 17 may also store a signed key incorporated by the manufacturer and a key or seed identifying a particular service provider that activated a platform feature.

Thus, in some embodiments, ownership of platform resources may be extended to multiple service providers. Some resources, however, are not shared, such as keys or seeds, while other resources are shared, like the manageability engine execute environment. The permit specifies which resources are authorized for use by the service provider. The platform also enforces access control over the resources dynamically, based on the requests that arrive over secure interfaces, such as host embedded controller interfaces (HECI). The manageability engine can distinguish between different service providers by keeping track of the key or seed that is used when servicing the command. Therefore, the key or seed authenticates the session. The session uses the permit to know which resources in the manageability engine, as well as the platform, are visible to that session.

The authenticated session allows the service provider to bundle service offerings, such as providing an anti-theft service bundled with other technology provided by the enhanced platform. The permit specifies the bundling configuration in some embodiments. The bundling also allows each service provider to specify security and configuration policies that are specific to that service provider. For example, one service provider may specify two factor authentication is needed, while another one may specify three factor authentication, and some other service provider may specify no authentication at all.

Figure 4:
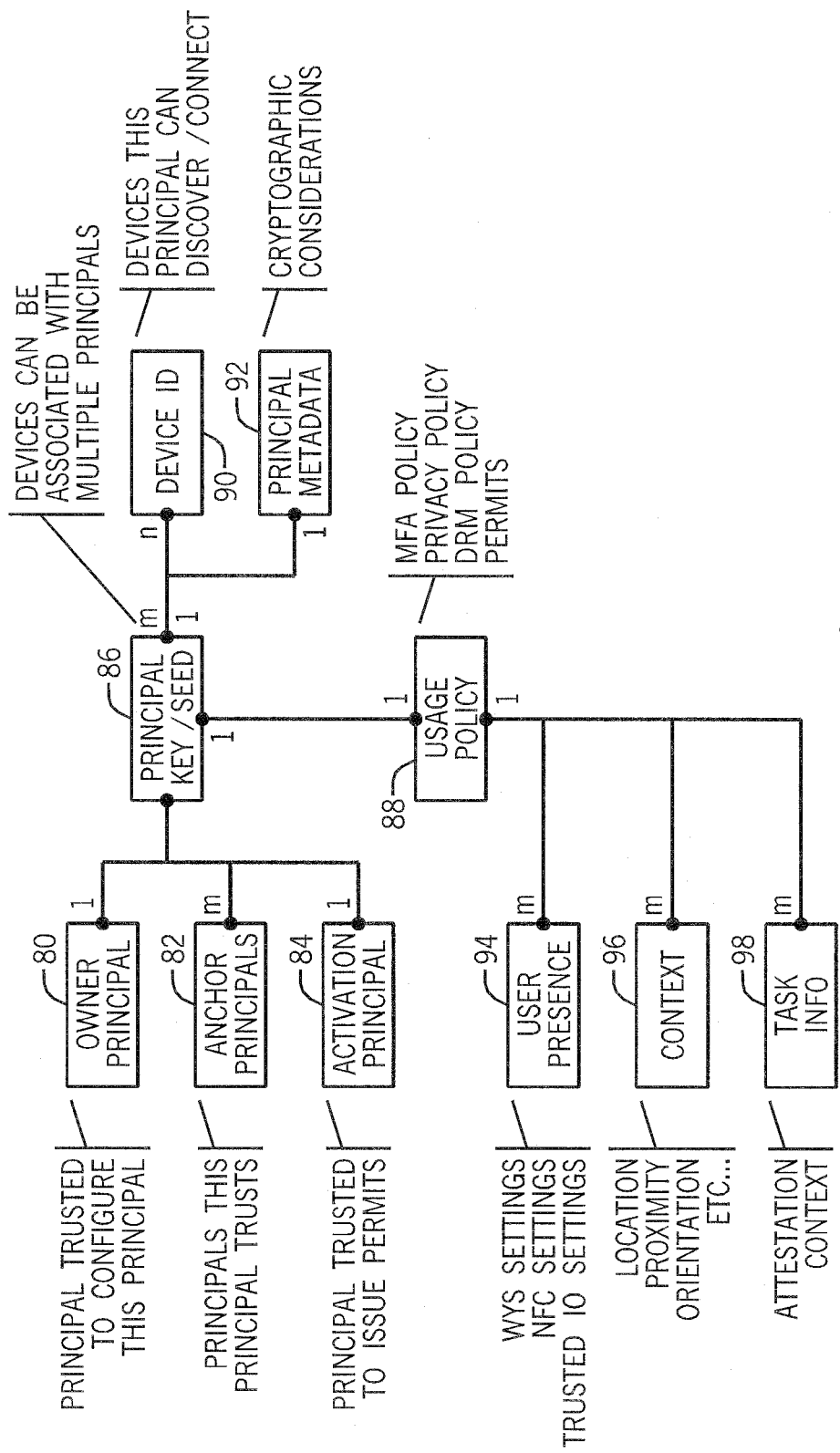
FIG. 4 is a key structure for a service provider in accordance with one embodiment of the present invention.

FIG. 4 shows one embodiment of the relationship of manageability resources representing the user or machine principal. Each principal may be associated with other principals and usage policies. Each object class may be described as follows. A principal or main principal may have a cardinality of 1 . . . m. The principal may be a key that contains the public and private components. The private components may be wrapped for a confidentiality whenever the key values are taken outside the manageability engine. The public key may be known as the SubjectPublicKey when used in the context of X.509 certificates. See ITU-T Recommendation X.509 (2005) Information Technology Open Systems Interconnection, The Directory Authentication Framework 08/05, available from the International Telecommunications Union, Geneva, Switzerland. When the key is used to interact with another system or device, it is the principal entity representing the end point. When the principal is used to authenticate a user, the principal "speaks for" the user. The objects associated with the principal, place restrictions on how the principal is permitted to represent or speak for the user.

The owner principal 80 has the cardinality 1 . . . 1. The owner principal is the service provider that has administrative control over the principal. The owner principal contains the keys 86 used to authenticate and communicate with the owner entity. It may contain the service provider public key used to authenticate the owner's certificate. It may also contain a session key (SK) and master key (MK) values corresponding to the secure session between the manageability engine and the service provider.

The anchor principals 82 have cardinality 0 . . . m. The owner principal may configure trust anchors that this anchor principal may trust when establishing secure connections to other devices or servers.

The activation principal 84 has cardinality 1 . . . 1. The activation principal refers to credentials used to authenticate the permit server. These credentials may be provided onboard a particular chipset that includes the manageability engine and includes the capability to turn on and off features of that chipset under remote control by the service provider. The activation transaction identifier (e.g. TX1) is part of this context and contains the activation state of the main principal.

The device identifier 90 has cardinality 0 . . . m. Devices that the manageability engine recognizes as being part of a trusted mesh or cloud have device identifiers. The owner principal may configure the device identifiers according to a prearranged configuration policy.

The principal metadata 92 has cardinality 1 . . . 1 and contains settings describing key migration, backup, and restore handling. Usage constraints, such as whether the key can be used for signing, encryption, or key exchange may be part of the principal metadata.

The usage policy 88 has cardinality 0 . . . 1 and refers to a set of policy controlled constraints upon the usage of the key. It may include multi-factor authentication (MFA) rules for how user presence is established. For example, user presence may be established by a user's recognized or signature pattern of usage of a mouse and display that enables a computer system to identify the computer user in one embodiment. Privacy policies may restrict the amount of information this key may sign or encrypt. Digital rights management policies may also restrict how data protected with this key may be redistributed through other devices.

User presence 94 may have cardinality 0 ... m and contains the service provider and user settable configuration values for technology that gives proof of the user's presence. This may include WYSIWYS, near field communications (NFC), Trusted Input/Output (IO), as well as other presence policies.

Context 96 with cardinality 0 ... m includes features and capabilities of the platform that are available for use when the main principal is used. Context sources may include sensor inputs, such as location, orientation, proximity, temperature, power, and battery, to mention a few examples.

Task information 98 has cardinality 0 ... m and contains attestation context describing the manageability engine environment in which the main principal is used.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a request at a manageability engine in a platform from a service provider's remote server to activate a feature of the platform coupled to said manageability engine;
   in response to said request, requesting in a secure fashion, proof of the service provider's authority to modify the platform including a certificate from a permit server that this service provider is authorized by a manufacturer of the manageability engine to use the platform feature;
   checking the certificate to prevent another service provider from using the platform feature;
   sending a request for verification of the service provider's authority to use the feature of the platform coupled to a processor;
   verifying that the service provider is authorized by a manufacturer of the processor to use the feature;
   activating the feature only for use by the service provider; and
   requesting, said proof using a cryptographic scheme enabling remote authentication of hardware devices, while preserving a privacy of a device owner, and using an embedded private key within said manageability engine to indicate that the service provider is certified by the manufacturer of the manageability engine.

2. The method of claim 1 including checking whether the service provider's authority has been revoked.

3. The method of claim 1 wherein said requesting proof includes generating an unactivated key in said manageability engine.

4. The method of claim 1 wherein said requesting proof includes using a signed key incorporated into the manageability engine by the manufacturer.

5. The method of claim 1 wherein said requesting proof includes providing proof that the manageability engine is legitimate.

6. The method of claim 1 wherein requesting includes supplying a certificate signing request to a service provider including signed attributes attesting to the legitimacy of the manageability engine's key.

7. The method of claim 1 including said manageability engine, in response to said request, receiving a permit and activating a key to enable the service provider to use the feature.

8. The method of claim 1 including, in response to said request, receiving in said manageability engine a service provider's public key or one-time password seed via a secure channel.

9. The method of claim 8 including storing in said manageability engine a different public key or seed for each of at least two service providers and using said key or seed to identify a service provider that requests reactivation of said feature.

10. One or more non-transitory computer readable medium storing instructions to enable a processor to perform a sequence comprising:
    receiving a request at a manageability engine in a platform from a service provider's remote server to activate a feature of the platform coupled to said manageability engine;
    in response to said request, requesting in a secure fashion, proof of the service provider's authority to modify the platform including a certificate from a permit server that this service provider is authorized by a manufacturer of the manageability engine to use the platform feature;
    checking the certificate to prevent another service provider from using the platform feature;
    sending a request for verification of the service provider's authority to use the feature of the platform coupled to a processor;
    verifying that the service provider is authorized by a manufacturer of the processor to use the feature;
    activating the feature only for use by the service provider; and
    requesting said proof using a cryptographic scheme enabling remote authentication of hardware devices, while preserving a privacy of a device owner, and using an embedded private key within said manageability engine to indicate that the service provider is certified by the manufacturer of the manageability engine.

11. The medium of claim 10 further storing instructions to receive a request at said processor from a service provider's server to activate the feature of the platform coupled to said processor.

12. The medium of claim 10 further storing instructions to use a signed key incorporated into said processor by the processor manufacturer.

13. The medium of claim 10 further storing instructions to provide proof that the processor is legitimate.

14. The medium of claim 10 further storing instructions to supply a certificate signing request to a service provider, including signed attributes attesting to the legitimacy of the processor's key.

15. The medium of claim 10 further storing instructions to receive a permit and activate a key to enable the service provider to use the feature.

16. The medium of claim 10 further storing instructions to receive, in said processor, a service provider's public key or one-time password seed via a secure channel.

17. The medium of claim 16 further storing instructions to store, in said processor, a different public key or seed for each of at least two service providers and use each key or seed to identify a service provider that requests reactivation of said feature.

18. The medium of claim 10 further storing instructions to decide whether the service provider's authorization has been revoked.

19. An apparatus comprising:
   a hardware processor to receive a request at a manageability engine in a platform from a service provider's remote server to activate a feature of the platform coupled to said manageability engine;
   in response to said request, request in a secure fashion, proof of the service provider's authority to modify the platform including a certificate from a permit server that this service provider is authorized by a manufacturer of the manageability engine to use the platform feature;
   check the certificate to prevent another service provider from using the platform feature;
   send a request for verification of the service provider's authority to use the feature of the platform coupled to a processor;
   verify that the service provider is authorized by a manufacturer of the processor to use the feature;
   activate the feature only for use by the service provider; and
   request said proof using a cryptographic scheme enabling remote authentication of hardware devices, while preserving a privacy of a device owner, and use an embedded private key within said manageability engine to indicate that the service provider is certified by the manufacturer of the manageability engine; and
   a memory coupled to said hardware processor.

20. The apparatus of claim 19 wherein said processor is the manageability engine.

21. The apparatus of claim 19, said processor to check whether the service provider's authority has been revoked.

22. The apparatus of claim 19, said processor to provide proof that said processor is authentic.

23. The apparatus of claim 19, said processor to supply a certificate signing request to a service provider, including signed attributes attesting to the legitimacy of the processor's key.

24. The apparatus of claim 19, said processor to receive a permit and activate a key to enable the service provider to use the feature.

25. The apparatus of claim 19, said processor to receive a service provider's public key or one-time password seed via a secure channel.

26. The apparatus of claim 25, said processor to store, in the manageability engine, a different public key or seed for each of at least two service providers and use said key or seed to identify the service provider that requests reactivation of said feature.

* * * * *